(12) United States Patent
Hawkins

(10) Patent No.: US 6,264,138 B1
(45) Date of Patent: Jul. 24, 2001

(54) PROPELLER GEARBOX

(75) Inventor: John M. Hawkins, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/650,378

(22) Filed: Aug. 29, 2000

Related U.S. Application Data

(63) Continuation of application No. PCT/US99/21228, filed on Sep. 15, 1999.
(60) Provisional application No. 60/100,933, filed on Sep. 18, 1998.

(51) Int. Cl.$^7$ ................................................. B64D 35/08
(52) U.S. Cl. ........................... 244/60; 244/65; 74/665 B; 74/665 E
(58) Field of Search .................................. 244/60, 53 R, 244/65; 74/665 B, 665 E, DIG. 5

(56) References Cited

U.S. PATENT DOCUMENTS

| 4,064,958 | 12/1977 | Kinoshita | 180/66 A |
|---|---|---|---|
| 4,177,693 | 12/1979 | Ivanko et al. | 74/651 |
| 4,531,694 | 7/1985 | Soloy | 244/54 |
| 4,811,627 | * 3/1989 | Mouille | 244/60 |
| 4,955,561 | * 9/1990 | Seefluth | 244/60 |
| 5,239,830 | 8/1993 | Banthin et al. | 60/718 |
| 5,271,295 | * 12/1993 | Marnot | 244/60 |
| 5,472,386 | * 12/1995 | Kish | 244/60 |
| 5,807,202 | * 9/1998 | Sammataro | 244/60 |

OTHER PUBLICATIONS

*Allied Signal TPF 351–20*, Single Sheet Drawing.
*Gear Drive Systems Design and Application*; Peter Lynwander, Cove Sheet and p. 302.
*Rolls–Royce Dart*, Single Sheet Drawing.
*T56/501 Series III Turboprop Engine*, Two Drawing Sheets.

* cited by examiner

Primary Examiner—J. Woodrow Eldred
(74) Attorney, Agent, or Firm—Woodard, Emhardt, Naughton, Moriarty & McNett

(57) ABSTRACT

An aircraft (10) having turboprop propulsion has a plurality of gas turbine engines (11), each with a two stage reduction gearbox (30,41) with the engine output shaft (17,17A) inline with the propeller drive output shaft (19,51) to drive a propeller (12) in front of the engine in a tractor mode of propulsion. The input gear reduction stage (20) and output gear reduction stage (21) share a plurality layshafts (22,38) mounted in fixed circularly-spaced relation to each other about the axis of the output shafts in the mechanical housing in the aircraft. Each layshaft of said plurality of layshafts has a layshaft first end toward the rear, input end of the gearbox, and a layshaft second end toward the output, front end of the gearbox. The layshaft gears are arranged to avoid any net thrust loading of the layshafts. Spur (26) and double helical (27) are used in FIG. 4, while spur gears 37 and 48 are used in FIG. 6 with suitable helix settings to neutralize end thrust on layshaft 38. Cantilever layshaft input gear (37) mounting in rear bearings (39) enables it to share some layshaft output gear 48 load sharing with the front bearing (40). A torquemeter (61) is conveniently situated at the gearbox input end. The engine output gear (25,36) and gearbox output gear (28,49), and propeller (12) all have colinear rotational axes.

12 Claims, 6 Drawing Sheets

PROPELLER GEARBOX

The present application is a continuation of PCT/US99/21228 filed Sep. 15, 1999, currently pending. The PCT application was based on a provisional patent application Ser. No. 60/100,933, filed Sep. 18, 1998, and the benefit of Ser. No. 60/100,933 is claimed in the PCT application. The content of PCT/US99/21228 and U.S. provisional application No. 60/100,933 are incorporated herein.

BACKGROUND OF THE INVENTION

The present invention relates generally to the design and construction of a gearbox for a gas turbine engine. More particularly, the present invention has one embodiment wherein the gearbox defines an inline two-stage reduction gearbox for a gas turbine turboprop engine.

Gas turbine turboprop engine designers generally couple a gear reduction gearbox with the engine in order to reduce the output shaft speed, and increase the torque delivered to an output device, such as a propeller. It is well known that gas turbine engines are high speed rotary equipment having components including an output shaft revolving at speeds from about 5,000 to 50,000 revolutions per minute. Sometimes, in order to harness the power from the output shaft of the gas turbine engine a gear reduction gearbox is coupled to the engine to decrease shaft rotation speed and increase output torque. Gear reduction gearboxes include gear sets therein for reducing the shaft speed during the transmission of power from the gas turbine engine to the propeller.

The application of gas turbine turboprop engines as a propulsion means for an aircraft often creates design parameter conflicts, such as the need for a durable long life gear train and the necessity to minimize the volume and weight of the respective engine. Prior designers of gas turbine engine gear reduction gearboxes have generally used multi-stage gearboxes to effectuate significant shaft speed reduction. Even with the variety of prior gas turbine gear reduction gearboxes there remains a need for an improved gear reduction gearbox. The present invention satisfies this need in a novel and unobvious way.

SUMMARY OF THE INVENTION

One form of the present invention contemplates an apparatus, comprising: an aircraft; at least one gas turbine turboprop engine coupled to the aircraft, the at least one gas turbine engine having an inlet end and an exhaust end, and a first member for transmitting power from the engine; a two stage reduction gearbox positioned proximate the inlet end and coupled to the engine, the gearbox having an input gear reduction stage coupled with and driven by the first member and a double helical output gear reduction stage coupled with a second member for transmitting power; and at least one propeller coupled to and driven by the second member.

Another form of the present invention contemplates an apparatus, comprising: an aircraft; at least one gas turbine turboprop engine coupled to the aircraft, the at least one gas turbine engine having an air inlet end and an exhaust end, and a first power transmission member for transmitting power from the engine; a gearbox positioned proximate the inlet end and coupled to the engine, the gearbox having two stages defined by an input gear reduction stage and an output gear reduction stage, the input gear reduction stage is coupled with and driveable by the first power transmission member and the output gear reduction stage is coupled with and drives a second power transmission member for transmitting power, the input gear reduction stage is defined by one of a spur or double helical gearing and the output gear reduction stage is defined by double helical gearing; and at least one propeller is coupled to and driven by the second power transmission member.

One aspect of the present invention contemplates a combination, comprising: an aircraft; at least one gas turbine engine coupled to the aircraft, the at least one gas turbine engine having an engine first end and an engine second end, and an engine output member for transmitting power from the engine; and a reduction gearbox positioned proximate the engine first end and coupled to the engine, the gearbox comprising: a mechanical housing; two gear reduction stages defined by an input gear reduction stage and an output gear reduction stage; a plurality of layshafts coupled with and having at least a portion thereof disposed within the mechanical housing, each of said plurality of layshafts having a layshaft first end and a layshaft second end; the input gear reduction stage includes a plurality of input gears, each of the plurality of layshafts having one of the input gears coupled to the layshaft first end and driven by the engine output member, the output gear reduction stage including a plurality of output gears, each of the plurality of layshafts having one of the output gears coupled to the layshaft second end, the plurality of output gears engaging and driving a gearbox output member that is coupled to a propeller; and wherein the plurality of input gears and the plurality of output gears eliminate thrust loading from the plurality of layshafts.

Another aspect of the present invention contemplates an apparatus, comprising: an aircraft; a gas turbine turboprop engine coupled to the aircraft, the gas turbine engine having an inlet end, an exhaust end, and a first power transmission member for transmitting power from the engine; a reduction gearbox positioned proximate the inlet end and coupled to the engine, the gearbox including: a mechanical housing; the gearbox having two stages of reduction defined by an input gear reduction stage and an output gear reduction stage, the input gear reduction stage defined by a first gear coupled to the first power transmission member and a plurality of second gears in meshing engagement with the first gear; the output gear reduction stage defined by a third gear and a plurality of fourth gears in meshing engagement therewith; a plurality of layshafts that are rotatably coupled with the mechanical housing, each of the plurality of layshafts having one of the plurality of second gears coupled at one end and one of the plurality of fourth gears coupled at the other end; the third gear coupled to and drives a second power transmission shaft having a propeller coupled thereto; and the input gear reduction stage is defined by one of a spur or double helical gearing and the output gear reduction stage is defined by a double helical gearing.

A preferred form of the invention includes torquemeter components inline with the engine output member and a power input gear of the first gear reduction stage.

The preferred form also mounts the input gears of the first stage layshafts in overhanging or cantilever manner from the input end of the layshafts, and the output gears of the second gear reduction stage in location between layshaft support bearings. The layshaft support bearings are located closer together and the output end bearing is relatively large in diameter, for better bearing load distribution and for longer bearing life.

One object of the present invention is to provide an improved propeller gear reduction gearbox.

These and other objects will become more apparent from the following description.

DESCRIPTION OF THE PREFERRED EMBODIMENT

Figure 1:
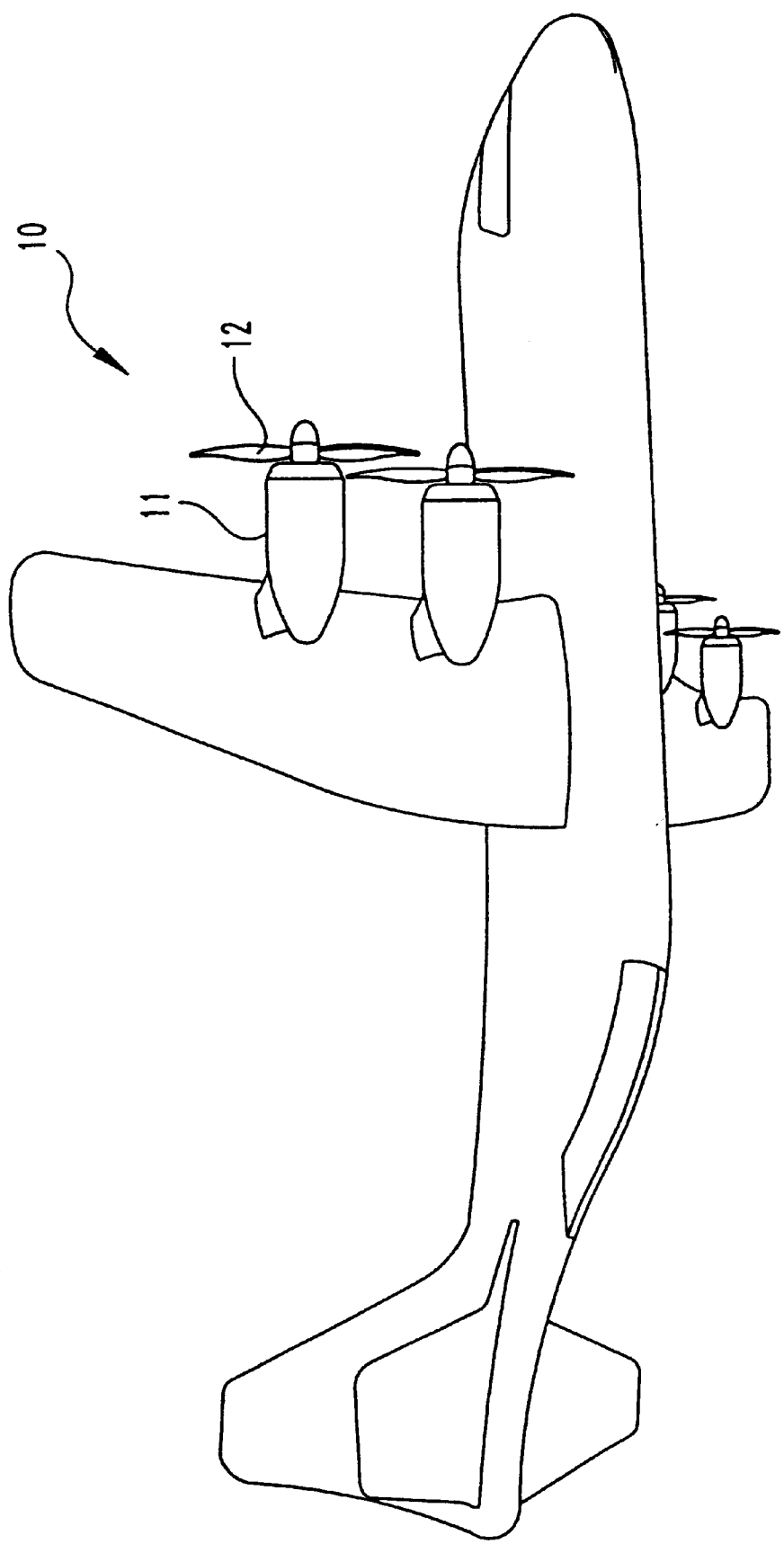
FIG. 1 is an illustrative view of an aircraft having a plurality of gas turbine turboprop engines coupled thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and flier modifications in the illustrated device, and such further applications of the principles of the invention as illustrated therein being contemplated as would normally occur to one skilled in the art to which the invention relates.

With reference to FIG. 1, there is illustrated an aircraft 10 having a plurality of gas turbine turboprop engines 11 coupled thereto for providing means for propelling the aircraft. In one embodiment the aircraft is a cargo aircraft, such as but not limited to the FLA turboprop being developed by Airbus. However, it should be clear that the present invention is applicable to turboprop aircraft in general and not a specific aircraft unless specifically stated. While FIG. 1, shows an aircraft having four engines it is not intended to limit the present disclosure to an aircraft having only four engines unless specifically stated. Aircraft having other quantities of engines from 1–6 are contemplated herein. Each of the plurality of gas turbine turboprop engines 11 includes a propeller 12 in front of the engine for tractor type propulsion. In the preferred embodiment, the propeller defines a single rotation propeller. However, it is clearly understood that the present invention is not limited to one particular aircraft design.

Figure 2:
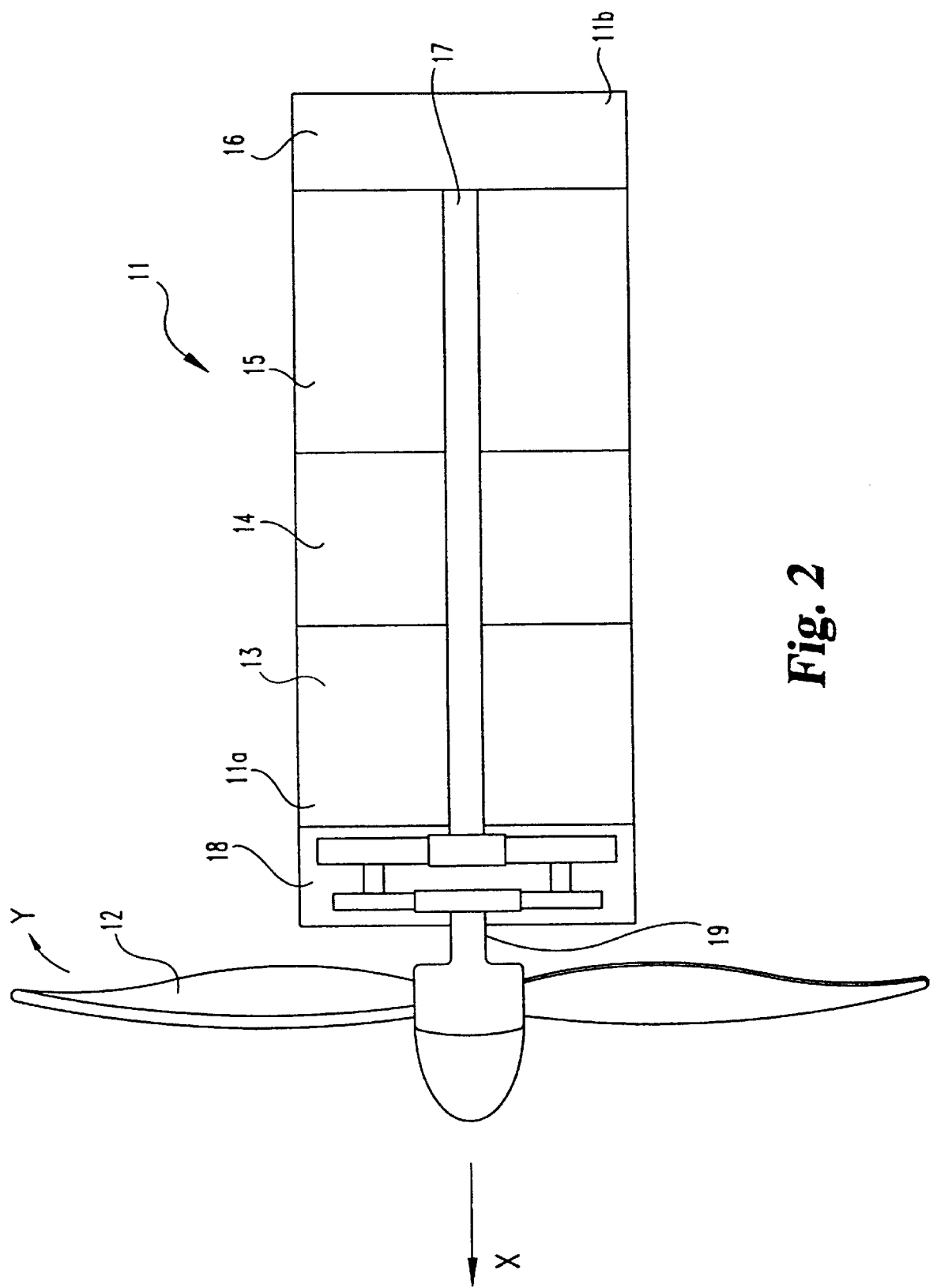
FIG. 2 is a schematic view of one of the gas turbine turboprop engine comprising a portion of FIG. 1.

With reference to FIG. 2, there is illustrated a block diagram of one embodiment of the gas turbine turboprop engine 11. Gas turbine engine 11 has forward inlet end 11a and an exhaust end 11b. In a preferred embodiment, the gas turbine turboprop engine 11 includes a compressor 13, combustor 14, turbine 15 and power turbine 16. One example of a gas turbine engine turboprop engine is the model DART available from Rolls-Royce. A person of ordinary skill in the art will appreciate that there are a multitude of ways to link the components together. Additional compressors and turbines could be added with intercoolers connecting between the compressors and reheat combustion chambers between the turbines. Power turbine 16 has a power transmission member 17 coupled thereto for delivering power to the propeller gearbox 18. The propeller gearbox 18 defines a single input, such as power transmission 17 member, and a single output, such as power transmission member 19, gearbox for driving the propeller 12. Input power transmission member 17 and output power transmission 19 are aligned with an axis X. In one embodiment, the output power transmission member 19 rotates in a clockwise direction as indicated by arrow Y as viewed from the exhaust end 11b of the engine 11.

Figure 3:
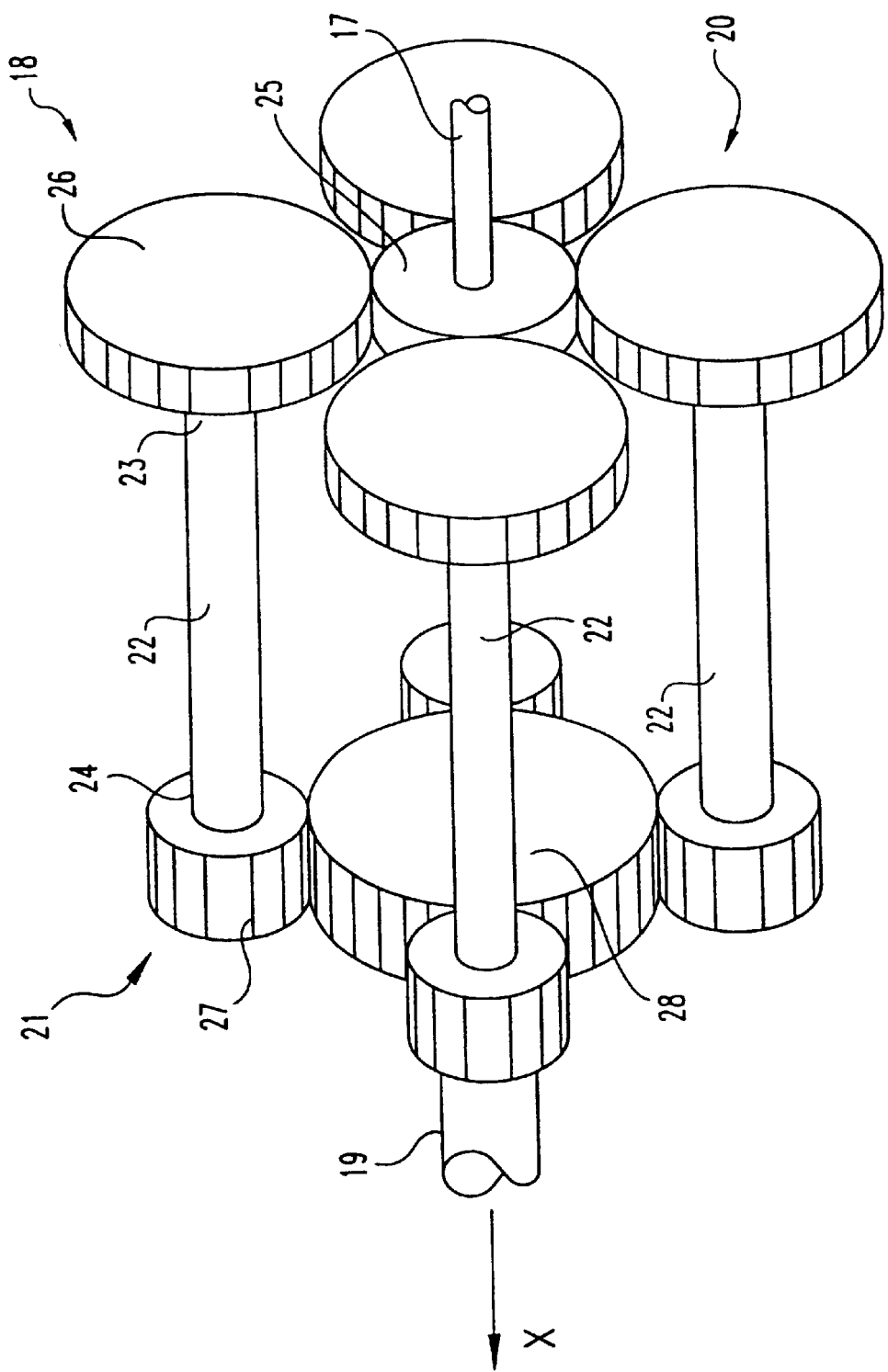
FIG. 3 is an illustrative view of one embodiment of a propeller gearbox comprising a portion of the FIG. 2 gas turbine turboprop engine.
Figure 4:
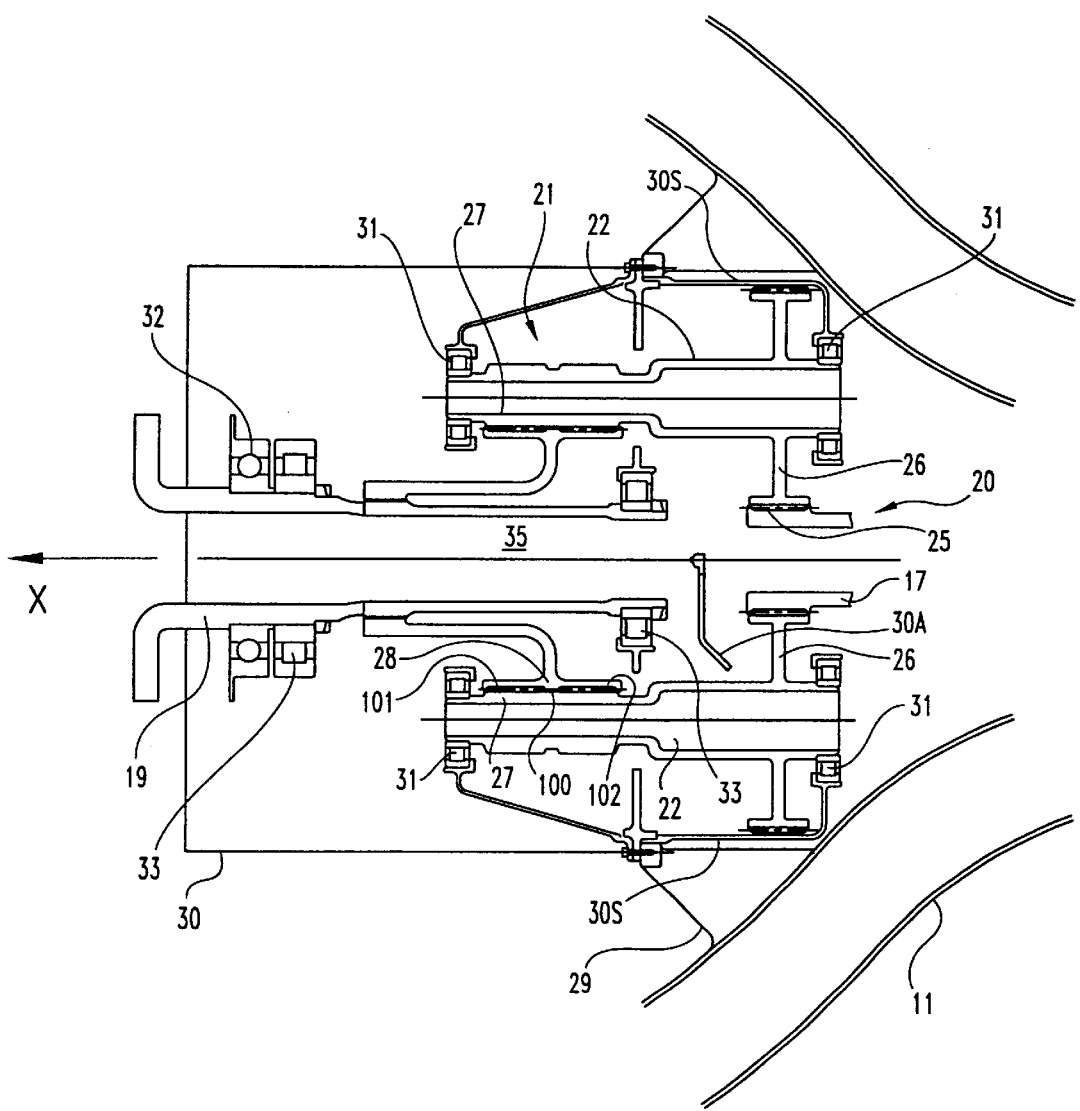
FIG. 4 is a sectional view of one embodiment of the propeller gearbox comprising a portion of the FIG. 2 gas turbine turboprop engine.

With reference to FIGS. 3 and 4, there is illustrated a form of the inline gear reduction system for the gas turbine turboprop engine 11. The gearbox 18 has two stages of reduction, which include a first stage of reduction 20 and a second stage of reduction 21. The first stage of reduction has a driven output gear 25 that is coupled to the power transmission member 17 coming from the gas turbine engine 11. Driven output gear 25 meshes with and drives a plurality of input gears 26. In the illustrated form of the present invention, four equally spaced gears 26 that engage the output gear 25 define the plurality of input gears 26. In this embodiment, the gear components for the first stage reduction 20 are preferably selected from spur or double helical gear sets, and preferably the gearing for the first stage reduction 20 of this embodiment is defined by a spur gear set. The term double helical gearing as utilized herein includes but is not limited to herringbone, a double helical gear having no separation between two helical portions, and a gear having a separation between the two helical portions. Referring to FIG. 4, there is illustrated a double helical gear having a separation zone 100 between the two helical portions 101 and 102.

The second stage of reduction 21 may also be referred to as the output stage and is defined by a single gearbox output gear 28 which meshes with a plurality of output gears 27. Preferably, four equally spaced gears define the plurality of output gears 27. The output gears 27 are utilized to drive the gearbox output gear 28 which is coupled to an output power transmission member 19 that drives the propeller 12. In the preferred embodiment the second stage/output stage 21 defines a double helical gearing, arrangement. A plurality of layshafts 22 is positioned within a mechanical housing and they extend substantially parallel with the axis X. Each of the plurality of layshafts 22 has a first end 23 and an opposite second end 24. The first end 23 having an input gear 26 coupled thereto and the second end 24 having an output gear 27 coupled thereto. It is understood that other quantities of output gears 27, input gears 26, and layshafts 22 are contemplated herein as needed by system parameters.

With further reference to FIG. 4, there is illustrated a sectional view of the gearbox 18 coupled to the gas turbine turboprop engine 11. The inline dual stage gear reduction system is located proximate the inlet end 11a of the gas turbine engine 11. A plurality of mounting members 29 couple the mechanical housing 30 and supporting structure of the gearbox 18 to the gas turbine engine 11. It is understood herein that the mechanical housing 30 may be formed integral with the gas turbine engine 11 housing, or may be a separate component with the mechanical housing containing the gearbox 18 therein. The layshafts 22 are supported at each of their first end 23 and their second end 24 by a bearing 31. In this embodiment, the bearings are rolling element radial load bearing and, because a double helical second stage 21 and a spur or double helical first stage 20 is utilized, the thrust loading on the plurality of layshafts 22 is eliminated. The first stage input gears 26 and second stage output gears 27 are located between the bearings 31 which support the layshafts for rotation in the mechanical housing/structure 30. In this embodiment, the gearbox output gear 28 is defined as an external gear. The external gear 28 is coupled to the output power transmission member 19 that drives the propeller 12. The design and construction of the gearbox 18 allows the access for prop pitch control mechanisms through the passageway 35 extending through the gas turbine engine 11 and which is inline with the: output power transmission member 19.

In the illustrated embodiment, the output gear 28 and output power transmission member 19 are coupled together as by splines, for example. Radial load bearing 33 and thrust bearing 32 support the output member 19 of the assembly to rotate relative to the mechanical housing. In the preferred embodiment, the bearings 32 and 33 are rolling element bearings, bearing 32 being a ball bearing, and bearing 33 being a roller bearing.

Figure 5:
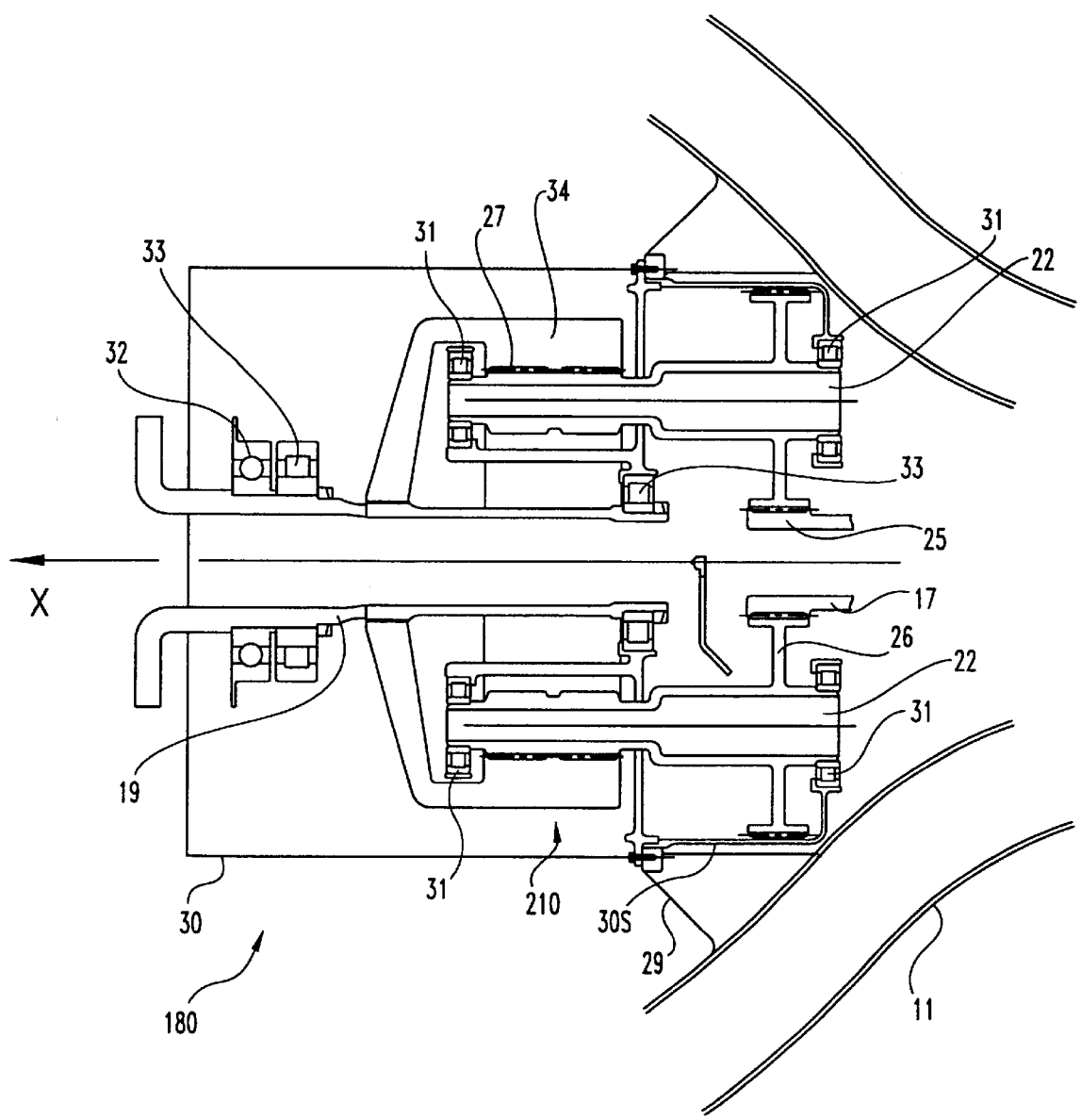
FIG. 5 is a sectional view of an alternative embodiment of a propeller gearbox comprising a portion of the FIG. 2 gas turbine turboprop engine.

With reference to FIG. 5, there is illustrated an alternate embodiment of an inline two stage reduction gearbox 180 that is substantially similar to the gearbox 18 and like feature numbers will be used to define like elements. The distinction that will be discussed with relation to FIG. 5 is that the second/output stage 210 of the gearbox 180 utilizes a dual helical gearing wherein the output gear 34 is an internal gear. More specifically, the output gear 34 defines a ring gear that is coupled to the output power transmission member 19. Owing to the utilization of an internal gear 34, the mechanical structure and bearings supporting the layshaft 220 have been rearranged. But the layshaft input gears 26, and the layshaft output gears 34 are between the bearings 31 as in the FIG. 4 embodiment. It is understood herein that other mechanical designs can be utilized to integrate an internal gear/ring gear 34 into an inline two-stage gear reduction gearbox utilizing a double helical gearing for the output stage.

Figure 6:
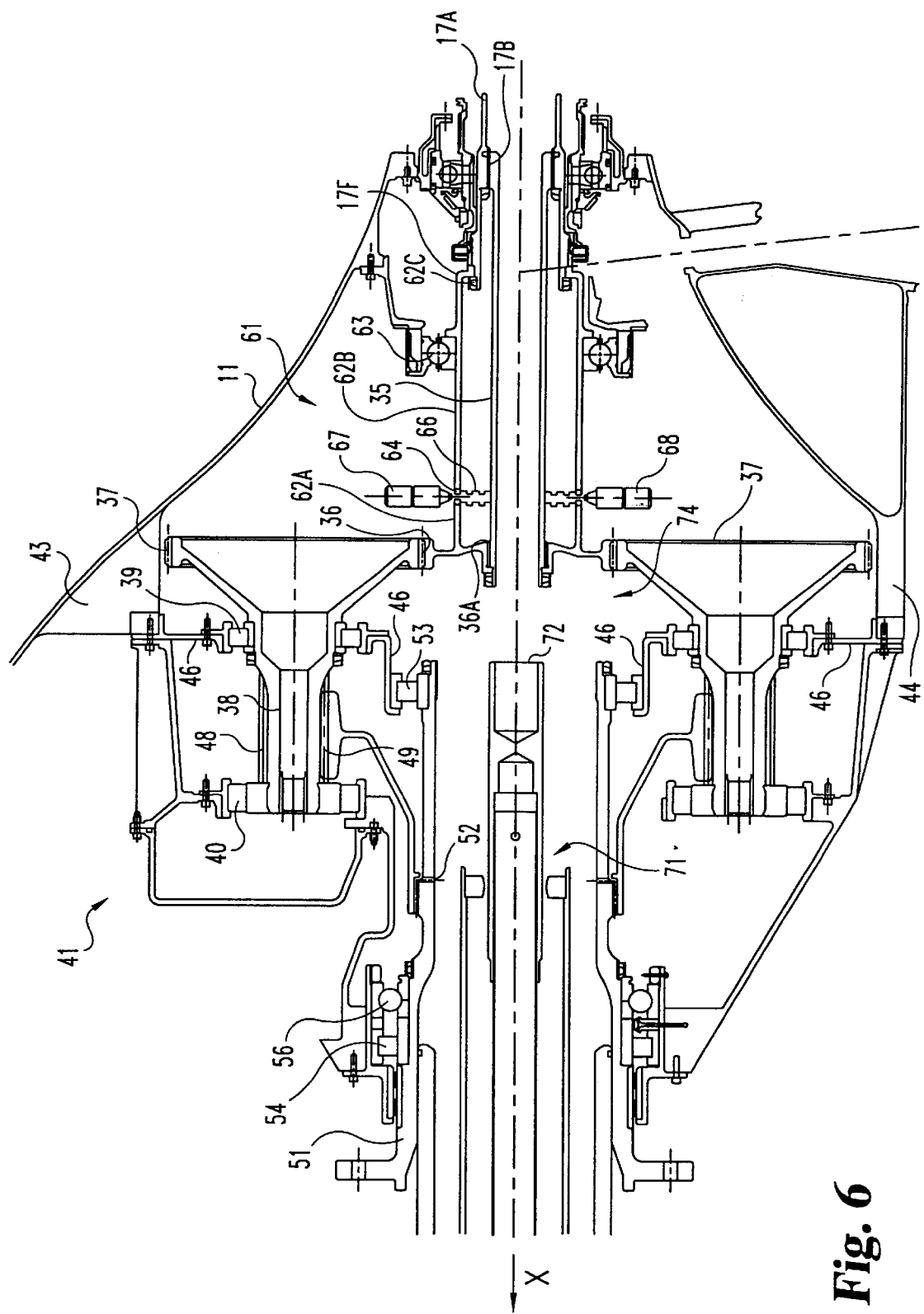
FIG. 6 is a sectional view of a flier alternative embodiment of a propeller gearbox comprising a portion of the FIG. 2 gas turbine turboprop engine.

With reference to FIG. 6, the gas turbine engine output shaft 17A is splined at 17B to gear box input shaft 35 to which input gear 36 is splined at 36A. Therefore, power output from the gas turbine is delivered to gear 36 which is in mesh with four circularly spaced gears 37, this combination comprising the first stage reduction. The gears 37 are on layshafts 38. Four such layshafts, circularly spaced about axis X are believed preferable, but as in the other embodiments, other numbers may be acceptable. The layshafts are mounted in bearings 39 and 40, whose outer races are mounted in the gear box housing 41 which is attached to the engine housing 11 as by bracket 43 at the top and 44 at the bottom. Of course, other attachment points are also used at appropriate circularly spaced locations about the axis X. The outer races of the bearings 39 are received in apertures in the wall or bulkhead 46 fixed in the gear box housing in a manner very similar to the mounting of the bearings 33 in the embodiments of FIGS. 4 and 5. But in this embodiment of FIG. 6, in contrast to the embodiments of FIGS. 4 and 5, the bearings at both ends of the layshafts are large, and closer together. This is facilitated by the conical wall gear web providing cantilever mounting of the gear 37 on the layshaft input end, overhanging the input end bearing 39. Each of the layshafts 38 has a helical gear 48 thereon engaged with the gear box output gear 49 which is splined to the output power transmission member 51 at 52. The inner end of the member 51 is supported by roller bearings 53 whose outer race is mounted in a central aperture in the web 46. The output end of the member 51 is mounted in the combination of roller bearing 54 and ball bearing 56 whose outer races are mounted in the gear box housing 41.

The gears in FIG. 6 are all helical. While double helical can be used in both reduction stages, as can be done in the first two embodiments, single helical is preferable. Thrust loading of the layshafts is avoided by setting the helix angles on the gears 39 and 40 so that the end thrust developed at the input gears 39 is balanced by the end trust developed in the output gears 40.

Referring further to FIG. 6, a torquemeter assembly 61 is provided in the engine housing. It comprises two tubular features. The first is a cylindrical wall 62A extending axially from the web of the input gear 36. The second is the tube 62B centered on axis X and supported by ball bearing 63. The rear end of tube 62B is received on the front end of engine shaft at 17F and fixed to it by a spanner nut 62C. Spanner nuts are used at various other locations in these gear boxes to hold gears on shafts, or shafts together at splines, and to hold bearing races on tubes, in ways known in the art. Wall 62A and tube 62B have facing ends at gap 64. The ends are notched in registry with each other as represented generally by square notches at 66. Sensors 67 and 68 located adjacent the notches are used to detect and quantify any displacement of the notches in the wall 62A relative to the facing notches in tube 62B. This information can be transmitted to a computer to indicate the amount of twist in the shaft 17B and, thereby, the torque being transmitted, in a manner known in the art. Such information is used in connection with engine control. While it is known to use torquemeters of some types for engine control, it is not believed not to have been done. inline between a gas turbine engine output shaft and its reduction gearbox input gear shaft colinear with the engine output shaft.

The cantilever mounting of the layshaft input gears enables the bearings 39 and 40 to be larger in diameter without enlarging the gearbox housing. Also, the very large loads usually occurring at the output end of the layshafts can be better distributed, with a greater part of the loads being taken by the input end bearing 39 than in the previous embodiments. Therefore this embodiment is expected to provide longer bearing life under normal conditions and under oil-off conditions too, than is likely in the embodiments of FIGS. 4 and 5.

In all three embodiments, there is access to propeller pitch mechanism from the back of the propeller shaft For example, in FIG. 6, the rear end of pitch control components 71 is at 72, radially inboard of the bearing 53. It is accessible through the space 74 behind the wall 46. In the FIGS. 4 and 5 embodiment, where the pitch control components are not shown but would be located as in the FIG. 6 illustration, the rear end would be accessible through an opening in the wall of portion 30S of the housing at a space or spaces between the layshafts as at 30A, for example.

Embodiments of the gearbox of the present invention have been designed for use with gas turbine turboprop engines having horsepower between 5,000 and 20,000 horsepower. A more preferred form of the present invention is designed for utilization with a gas turbine engine developing 11,260 horsepower. Further, the dual stage gear reduction gearbox is designed for section ratios in the range of 5:1–20:1. A more preferred form of the present invention uses an overall reduction ratio of 8.63:1. The output speed of the rotating propeller is preferably within a range of 700 to 1,500 revolutions per minute and more preferably has a maximum speed output of about 850 revolutions per minute. However, other horsepower, gear reduction ratios and output speeds are contemplated for the propeller gearbox of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination, comprising:

an aircraft;

at least one gas turbine engine coupled to said aircraft;

an engine output member for transmitting power from said engine;

a reduction gearbox positioned proximate said engine and coupled to said engine, said gearbox comprising:

a mechanical housing;

an input gear reduction stage and an output gear reduction stage, with a plurality of layshafts mounted to and having at least a portion thereof disposed within said mechanical housing, each layshaft of said plurality of layshafts having a layshaft few end and a layshaft second end;

said input gear reduction stage including:

an engine output gear coupled to said engine output member;

a plurality of layshaft input gears, one of said input gears on the first end of each layshaft and driven by said engine output gear;

said output gear reduction stage including:

a gearbox output member having a gearbox output gear thereon;

a plurality of layshaft output gears, one of said output gears on the second end of each layshaft and driving said gearbox output gear; and a propeller coupled to said gearbox output member;

said plurality of layshaft input gears and said plurality of layshaft output gears being arranged to eliminate thrust loading from said layshafts; and said engine output gear, and said gearbox output gear, and said propeller all having colinear rotational axes.

2. The combination of claim 1 and further comprising:

first layshaft bearings mounted on said housing proximate the first ends of said layshafts;

second layshaft bearings mounted on said housing proximate the second ends of said layshafts;

said layshaft input gears being proximate said first ends, and said layshaft output gears being proximate said second ends, said layshaft output gears being between the first and second layshaft bearings on each layshaft, said first layshaft bearings being between said layshaft input gears and said layshaft output gears.

3. The combination of claim 2 and wherein:

said second layshaft bearings have an outside diameter at least as great as the outside diameter of said first layshaft bearings.

4. The combination of claim 2 and wherein:

said layshaft input gears and said layshaft output gears are helical gears, and the helix angle on the layshaft input gear of a layshaft and the helix angle on the layshaft output gear of the layshaft are set to balance the axial thus applied to the layshaft by the layshaft input and layshaft output gears whereby thrust loading of the layshafts to the housing is avoided.

5. The combination of claim 2 and wherein:

said layshaft input gears include conical walls extending radially outward and axially away from the first layshaft bearings toward the engine.

6. The combination of claim 2 and further comprising:

a torquemeter coupled to the engine output member and to the engine output gear.

7. The combination of claim 6 and wherein the torquemeter includes:

a first shaft connected to the engine output gear;

a first tube non-rotatably connected to the engine output member and having reference features on an end thereof;

a second tube on the engine output gear and having reference features on an end thereof and facing and normally in registry with the registry features of the first tube in the absence of transmission of torque from the engine output member to the layshaft input gears; and sensor means associated with the reference features of the first and second tubes for detecting a non-registry condition of the reference features of the first and second tubes.

8. The combination of claim 1, wherein said input gear reduction stage employs spur gearing, and said output gear reduction stage employs double helical gearing.

9. The combination of claim 1, wherein said input gear reduction stage and said output gear reduction stage employ double helical gearing.

10. The combination of claim 1 and wherein:

said gas turbine engine has an forward inlet end and an exhaust end, and said engine output member extends forward from said inlet end of said engine;

said reduction gearbox is positioned proximate said inlet end;

said engine output gear meshes with said layshaft input gears; and said layshaft output gears mesh with said gearbox output gear.

11. The combination of claim 10 and wherein:

said propeller is in front of said gearbox and the forward inlet end of the engine.

12. The combination of claim 11 and further comprising:

additional gas turbine engines with reduction gearboxes and propellers substantially like the engines and gearboxes and propellers of claim 11 and mounted to the aircraft with the propellers in the tractor mode of operation in front of the engines.

* * * * *

UNITED STATES PATENT AND TRADEMARK OFFICE
CERTIFICATE OF CORRECTION

PATENT NO. : 6,264,138 B1
DATED : July 24, 2001
INVENTOR(S) : John M. Hawkins

Page 1 of 1

It is certified that error appears in the above-identified patent and that said Letters Patent is hereby corrected as shown below:

<u>Column 7, claim 1,</u>
Line 17, change "few" to -- first --.

<u>Column 8, claim 4,</u>
Line 3, change "thus" to -- thrust --.

Signed and Sealed this

Fifth Day of March, 2002

Attest:

JAMES E. ROGAN
*Attesting Officer*     *Director of the United States Patent and Trademark Office*